(12) United States Patent
Yabe

(10) Patent No.: US 6,640,003 B1
(45) Date of Patent: Oct. 28, 2003

(54) SURFACE INSPECTION SYSTEM FOR WORK BOARDS

(75) Inventor: Tomoyoshi Yabe, Aichi (JP)

(73) Assignee: Nichiha Corporation, Aichi (JP)

( * ) Notice: Subject to any disclaimer, the term of this patent is extended or adjusted under 35 U.S.C. 154(b) by 0 days.

(21) Appl. No.: 09/534,505

(22) Filed: Mar. 24, 2000

(30) Foreign Application Priority Data

Mar. 25, 1999 (JP) .......................................... 11-081811

(51) Int. Cl.[7] .................................................. G06K 9/00
(52) U.S. Cl. ........................... 382/151; 382/152; 348/95
(58) Field of Search ................................. 382/141, 151, 382/152; 348/94, 95, 87, 134

(56) References Cited

U.S. PATENT DOCUMENTS

| | | | | |
|---|---|---|---|---|
| 4,188,544 A | * | 2/1980 | Chasson | ................ 250/559.06 |
| 4,498,778 A | * | 2/1985 | White | ........................ 356/606 |
| 4,519,041 A | * | 5/1985 | Fant et al. | ................... 382/141 |
| 5,751,403 A | * | 5/1998 | Mizutani et al. | .............. 355/53 |
| 6,327,374 B1 | * | 12/2001 | Piironen et al. | ............ 382/108 |

* cited by examiner

*Primary Examiner*—Amelia M. Au
*Assistant Examiner*—Virginia Kibler
(74) *Attorney, Agent, or Firm*—Shook, Hardy & Bacon LLP

(57) ABSTRACT

A system for inspecting the surface of elongated work boards being moved, which is featured in that the work boards are photographed using a digital camera, that line image data which intersect with a moving direction of the work boards are extracted, and that the resultant line image data are integrated and synthesized to obtain a synthesized image, which is then displayed to evaluate the worked state of the work boards.

5 Claims, 19 Drawing Sheets

SURFACE INSPECTION SYSTEM FOR WORK BOARDS

BACKGROUND OF THE INVENTION

1. Field of the Invention

The present invention relates to a surface inspection system for elongated work boards (elongated boards to be worked) such as building boards, and in particular, to a system for automatically inspecting the surface of work boards that have been treated in each manufacturing process.

2. Description of the Related Arts

In the conventional continuous coating line of work boards for instance, a large number of raw boards to be coated are placed one by one onto the working line in predetermined time intervals so as to successively execute various sequential workings thereof including a back surface coating process (using a sealing paint), a drying process, a surface undercoating process (using a sealing paint), a drying process, a surface intermediate coating process (using a concave portion color paint), a drying process, a surface top coating process (using a convex portion color paint), a drying process, a clear coating process, and a drying process, thus obtaining the finally coated building boards. The surface of the work boards after being treated in each coating and drying process exhibits a specific surface color. However, these specific colored surfaces after each process are scarcely inspected. Namely, the inspection process is usually arranged at the final stage in the aforementioned continuous coating line, so that the inspection of the building board is usually performed for the final products in that continuous coating line. Therefore, the evaluation of the continuous coating work at each manufacturing process is inevitably determined by simply observing the surface with operator's naked eyes.

One of the reasons which make it difficult to perform the inspection of the surface of the work boards on the way in continuous coating line is assumed to be as follows. Namely, in the case where the inspection process is to be performed at the final stage, all manufacturing processes of continuous coating line has been already finished, so that it is possible to precisely transfer the building board, the both ends thereof being guided by guiding members for instance, onto a predetermined position at an optimum velocity, thus making it possible to take a picture of the surface of the building board by making use of an inspection TV camera which has been installed just above the predetermined position.

Whereas if the inspection is to be performed on the way in the continuous coating line, means for controlling the work boards so as to enable them to move over a predetermined position is required to be installed all along the transferring line of the work boards which are to be individually transferred at a high velocity (40–60 m/min.), thus requiring an enormous cost for the installation. Additionally, it is often required, at the occasion of transferring the work boards from one working process to the next working step, to inevitably change the moving direction of the work boards in conformity with the layout of factory. In such a case, the moving velocity of the work boards is also often required to be changed. As a matter of fact, it is very difficult in such a case to render the work boards to move at a fixed velocity and over a fixed location only for the purpose of inspecting the work boards at each working step. If there is a location where the movement of work boards (building boards) is temporarily stopped in the transferring line, it would be possible to take the picture of the entire surface of each elongated work board by making use of a plurality of digital cameras so as to obtain the image data of the work board. However, if the opportunity of obtaining the image data of the work board is limited to such a resting location in the transferring line of the work boards, it is impossible to perform the inspection of the work boards at each of the working processes.

Generally speaking, the field where an inspection TV camera can be employed is limited to a situation where it is to be employed for observing a sheet-like body moving continuously at a fixed velocity, or to a situation where it is to be employed for watching a board to detect any abnormal moving thereof. However, it is difficult to utilize an inspection TV camera in a situation where the worked surface of work boards at each working process is required to be evaluated more or less precisely.

In order to observe the surface of moving work boards, it is required to establish a technique to obtain image data of the surface of work boards by carefully taking the following unfavorable inspection conditions into consideration. Namely, the unfavorable inspection conditions are; (1) the work boards to be watched are being moved at a high velocity; (2) the work boards are subject to changes in moving velocity during the moving thereof; (3) the work boards are not necessarily allowed to move over a fixed location in the transferring line thereof; and (4) each of the work boards to be inspected is so long as 2 to 3 meters.

On the other hand, it is not preferable, in view of promoting labor saving, to adopt an idea to make an operator observe the finished condition of individual work board at each working step. Even if the operator's observation is limited to only important processes, the continuous observation thereof is still burdensome for the operator and still more, the reliability of the judgment through the operator's observation is not so high, especially when the moving object to be watched is lengthy such as in the case of the building boards.

SUMMARY OF THE INVENTION

The present invention has been made under the aforementioned circumstances, and therefore an object of the present invention is to provide a surface inspection system for elongated work boards, which is capable of reliably observing the finished condition of elongated work board at each working process in a continuous working line through which the work boards are allowed to move individually.

Namely, according to the present invention, there is provided a surface inspection system for work boards, which comprises a digital camera for photographing an elongated work boards, an image data-extracting means for extracting a line image data on a sampling line intersecting with a moving direction of the work boards from an output of the digital camera, and an image data-synthesizing means for integrating and synthesizing the line image data fed from the image data-extracting means.

The image data-extracting means is designed to take, as the sampling line thereof, a line which passes through an intersection point between a pair of diagonal lines in the photographing zone of the digital camera and approximately orthogonally intersects with the longitudinal direction of the work boards, thereby making it possible to minimizing a distortion of image that might be brought about by the lens of the digital camera.

The surface inspection system may be further provided with a velocity measuring means to measure the moving velocity of the work boards, and the image data-synthesizing means is designed to determine positional information of the line image data in relative to the entire body of the work board on the basis of the moving velocity measured by the velocity measuring means, thereby making it possible to obtain an image data of high precision even if the work boards are caused to change in velocity and to meander.

Further, the surface inspection system may be further provided with a slanted degree-measuring means to measure the slanting degree of the work boards, and the image data-extracting means is designed to change the sampling line on the basis of the slanting degree of the work boards measured by the slanted degree-measuring means, thereby making it possible to obtain an image data of high precision even if the work boards are caused to move slantly.

The slanted degree-measuring means is designed to measure the slanting degree of the work boards on the basis of the distance between a pair of intersection points to be formed between one straight line in the photographing zone of the digital camera and the outer line of the work board, thereby making it possible to easily determine the slanting degree of the work boards without necessitating the employment of additional detecting means.

Moreover, the slanted degree-measuring means is designed to detect an abnormal moving of the work boards and to inform an operator of the abnormal moving.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferable embodiments of the present invention will be explained in detail with reference to the drawings. Although a building board will be exemplified as a work board in this specification, the present invention is applicable also to any other kinds of elongated work boards.

Figure 1A:
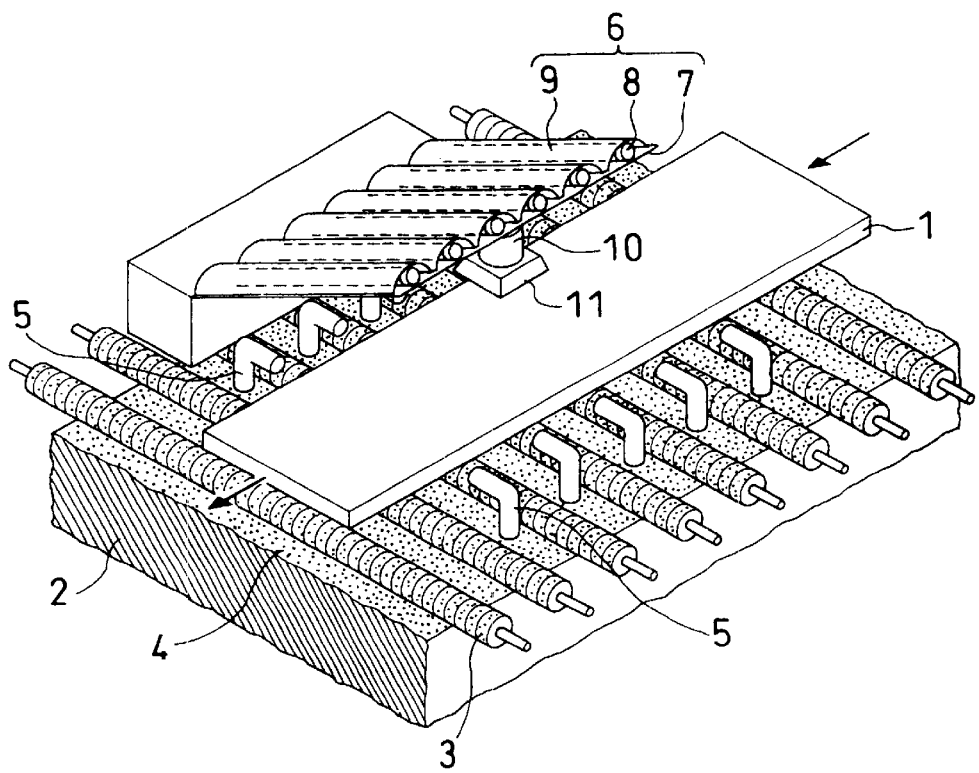
FIG. 1 is a perspective view showing the general outline of the surface inspection system according to one embodiment of the present invention.
Figure 1B:
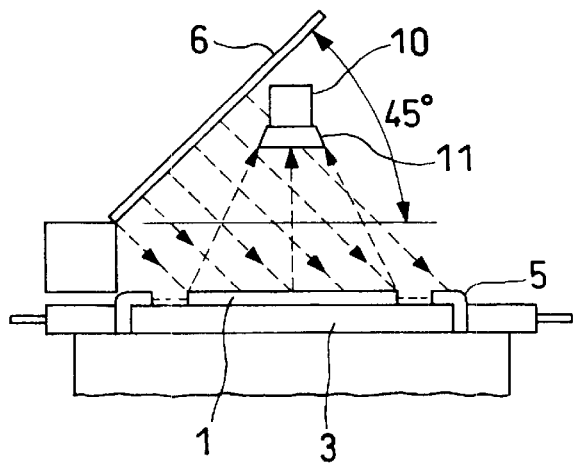

FIG. 1 shows the general outline of the surface inspection system according to one embodiment of the present invention. Transfer rollers 3 arranged in a row are mounted on the upper surface of a background base 2, and work board 1 is placed on the row of transfer rollers 3 so as to be moved forward. The surface of each transfer roller 3 is coated in black color or wrapped with a black tape. Further, the upper surface of the background base 2 is coated in black or adhered with a black board, thereby constituting a black background 4. Photoelectric switches 5 each comprising a floodlight and a photodetector and arranged in a row are respectively interposed between the neighboring transfer rollers 3.

An illuminating equipment 6 inclined at an angle of 45 degrees is disposed over the work boards. This illuminating equipment 6 is composed of a front transparent plate 7, a plurality of fluorescent amps 8 disposed behind the transparent plate 7, and a reflection cover having a white inner surface. Preferably, the fluorescent lamps are respectively formed of a daylight fluorescent lamp.

Figure 1C:
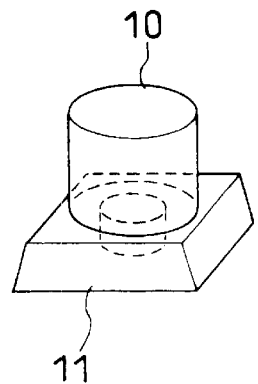

A digital camera 10 is arranged between the work board 1 and the illuminating equipment 6. More specifically, the digital camera 10 is disposed at the central zone of the illuminating equipment 6 (based on the moving direction of the work board 1) and just above the center in the traverse direction of the work board 1. Further, a hood 11 is attached to the front portion of the digital camera 10 (FIG. 1C).

Preferably, this digital camera 10 is of as high precision as 1.5 million pixels or so. This digital camera 10 is also called an electronic still camera which is known to function in such a manner that an input light is designed to be irradiated onto a CCD which is composed of a large number of minute elements each capable of converting the intensity of light into the magnitude of electric signals and that when the shutter thereof is clicked, the resultant electric signals are transferred all at once to an external device. The electric signals supplied from the CCD are digitized according to the magnitude thereof, and the resultant digitized signals are then processed by means of a CPU so as to restore them as a full color image. This full color image can be recorded as an image data of JPEG format for example in a semiconductor memory card (non-volatile memory such as an EEPROM can be employed).

As for the CCD, there are known two types of system, i.e. a scanning system called a progressive scan wherein the information of pixels are read out all at once, and an interlace scanning system wherein the information of pixels are read out in two processes, i.e. every other line. According to the present invention however, the former system can be preferably employed. According to this former system, the camera can be actuated without requiring a physical shutter, and the shutter can be actuated at a speed of as high as 1/10,000 second. In the actual employment of the camera however, an electronic shutter speed falling within the range of 1/4 to 1/1,000 second is suitably selected.

For the purpose of reproducing the colors, a color filter comprising a large number of pixels each enabling only a specific color component to pass therethrough is attached to the camera, and the signals obtained are synthesized to reproduce a full color image. The color filter that can be employed in this case is a primary color filter (R, G, B) for instance.

Figure 2:
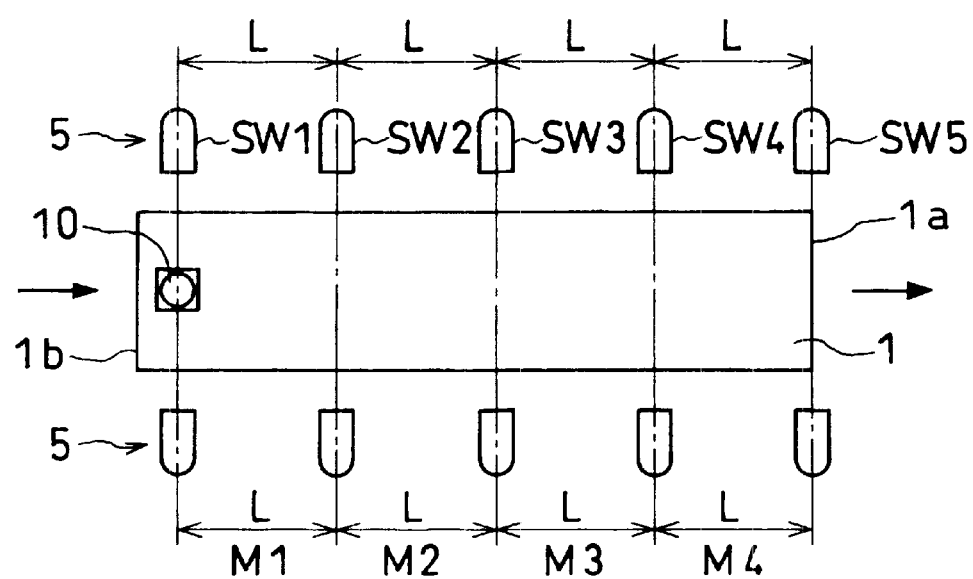
FIG. 2 is a schematic view illustrating the principle in the measurement of moving velocity of work boards.

FIG. 2 illustrates the principle in the measurement of moving velocity of work board 1. In this case, the work board 1 is divided into four zones along the longitudinal direction of the work board 1 (although the number of division is optional, the larger this number is, the higher the measurement accuracy would become), and a photoelectric switch 5 is disposed at every distance L which is close to 1/4 of the length of the work board 1. The photoelectric switches 5 thus arranged are indicated by the symbols SW1, SW2, SW3, SW4 and SW5 as counted from the rear side of the moving direction (the direction indicated by the arrow).

When the passing of the leading end portion 1a of the work board is detected by the switch SW1, the pulse counter 27b is actuated (FIG. 11) to start the counting of the number of pulse P1 until the passing of the leading end portion 1a of the work board is detected by the next switch SW2, the resultant number of pulse P1 being recorded as the number of pulse P1 of the measurement zone M1. Since the required time T1 can be determined from the recorded number of pulse P1, the velocity v1 of the work board in the measurement zone M1 can be calculated as follows:

$$v1 = L/T1 \text{ [(m/sec)]} \tag{1}$$

Likewise, the velocity v2, v3, v4 of the work board in each measurement zone M2, M3, M4 can be calculated.

FIG. 3 illustrates a state of taking a picture of moving work board 1 by making use of the digital camera 10.

Figure 3A:
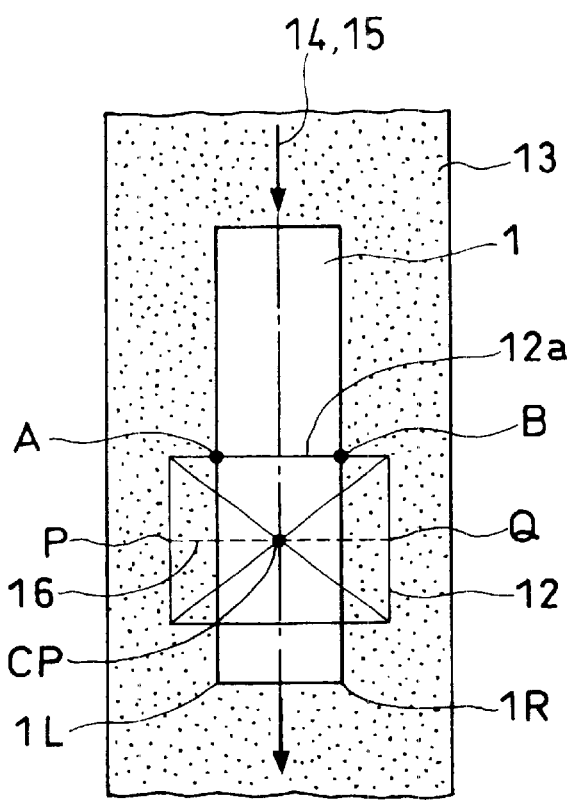
FIG. 3 is a schematic view illustrating a state of taking a picture of moving work board by making use of a digital camera.

FIG. 3A illustrates a state of taking a picture of moving work board 1 when the work board 1 is normally moved, wherein the work board 1 is being moved in the direction of the arrow with the center line 15 of the work board 1 over the transfer zone (constituted by a row of transfer rollers 3) 13 being aligned with the imaginary move-controlling center line 14. The reference number 12 indicates a rectangular photographing zone of the digital camera 10, wherein the rear end line (reference number 12a) thereof constitutes not only a detecting line to start the photographing, but also a detecting line for detecting a slanted moving. In this case, the intersection point between the slanted move-detecting line 12a and the left corner portion 1L of the work board 1 constitutes a left side slanted moving judgment point A, while the intersection point between the slanted move-detecting line 12a and the right corner portion 1R of the work board 1 constitutes a right side slanted moving judgment point B. Further, the intersection point between the diagonal lines of the rectangular photographing zone 12 constitutes a middle point of the image data sampling line 16, i.e. a center point CP. In this case, the image data sampling line 16 always passes through this center point CP and is designed to be pivoted about this center point CP so as to change the position of the image data sampling line 16 depending on the magnitude detected of the slanted moving. The position of this image data sampling line 16 is a portion which can be least affected by the distortion of image in the photographing using a lens.

Figure 3B:
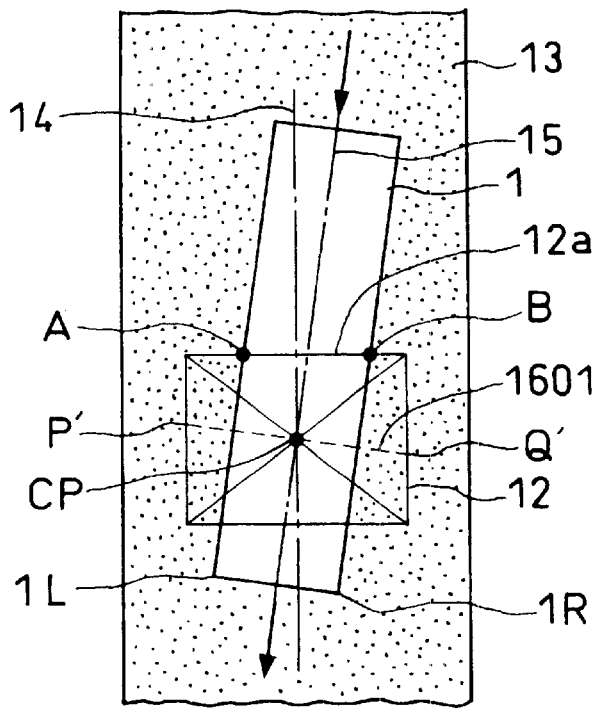

FIG. 3B illustrates a state of taking a picture of moving work board 1 when the work board 1 is slantly moved, i.e. the work board is being moved in a state where the imaginary move-controlling center line 14 is inclined from the center line 15 of the work board 1 by an angle of some degree. In FIG. 3B, the line P'–Q' (slanted moving line) 1601 is a straight line passing through the center point CP, and, as explained hereinafter, the position of the line P'–Q' 1601 within the photographing zone is regulated by the left side slanted moving judgment point A and the right side slanted moving judgment point B (to be explained in detail with reference to FIG. 4).

Figure 4:
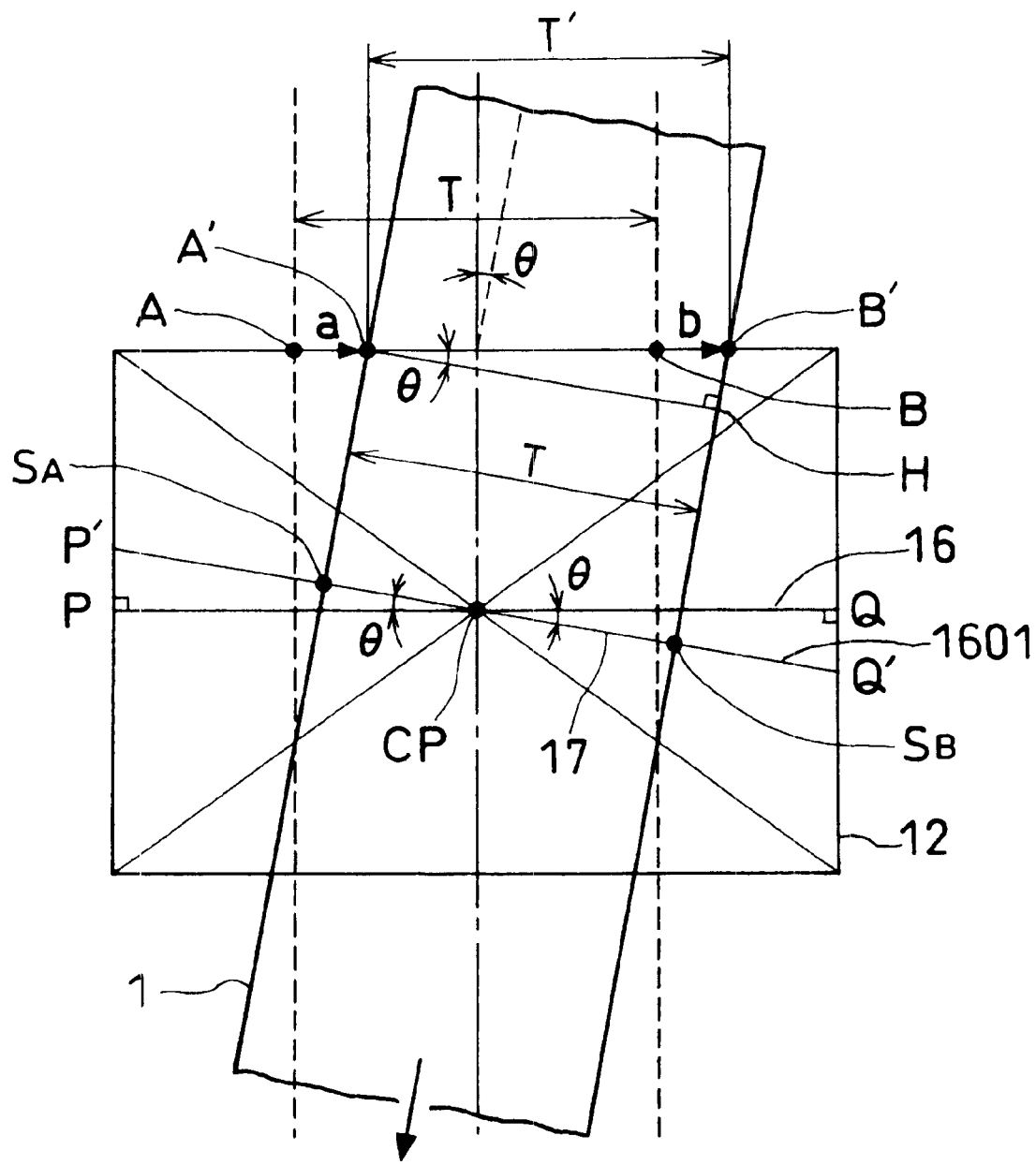
FIG. 4 is a schematic view illustrating the principle of detecting the slanted degree of a work board.

FIG. 4 illustrates the principle of detecting the slanted degree of a work board 1. This slanted degree θ can be represented by the angle of deviation of the slanted moving line 1601 in relative to the image data sampling line 16. If the distance between the intersections A and B of the work board 1 (the width of work board) moving normally is represented by T, and if the distance between the intersections A' (an intersection between the left side edge of the slanted work board 1 and the photographing zone 12) and B' (an intersection between the right side edge of the slanted work board and the photographing zone 12) is represented by T', the relationship between T and T' would become T'>T.

In the triangle as defined by the points A', H and B' shown in FIG. 4, T can be represented by: T=T'cos θ, and therefore, $$\theta = \cos^{-1} T/T' \tag{2}$$

The image data sampling line during the slanted moving is altered to the line 1601. Then, this altered image data sampling line 1601 is employed to determine the intersection points SA and SB thereof intersecting with the work board 1 by making use of a difference in brightness between the surface of the work board 1 and the background 4. Then, the image data along the line 17 between the points SA and SB becomes a line image data of the work board.

Figure 5:
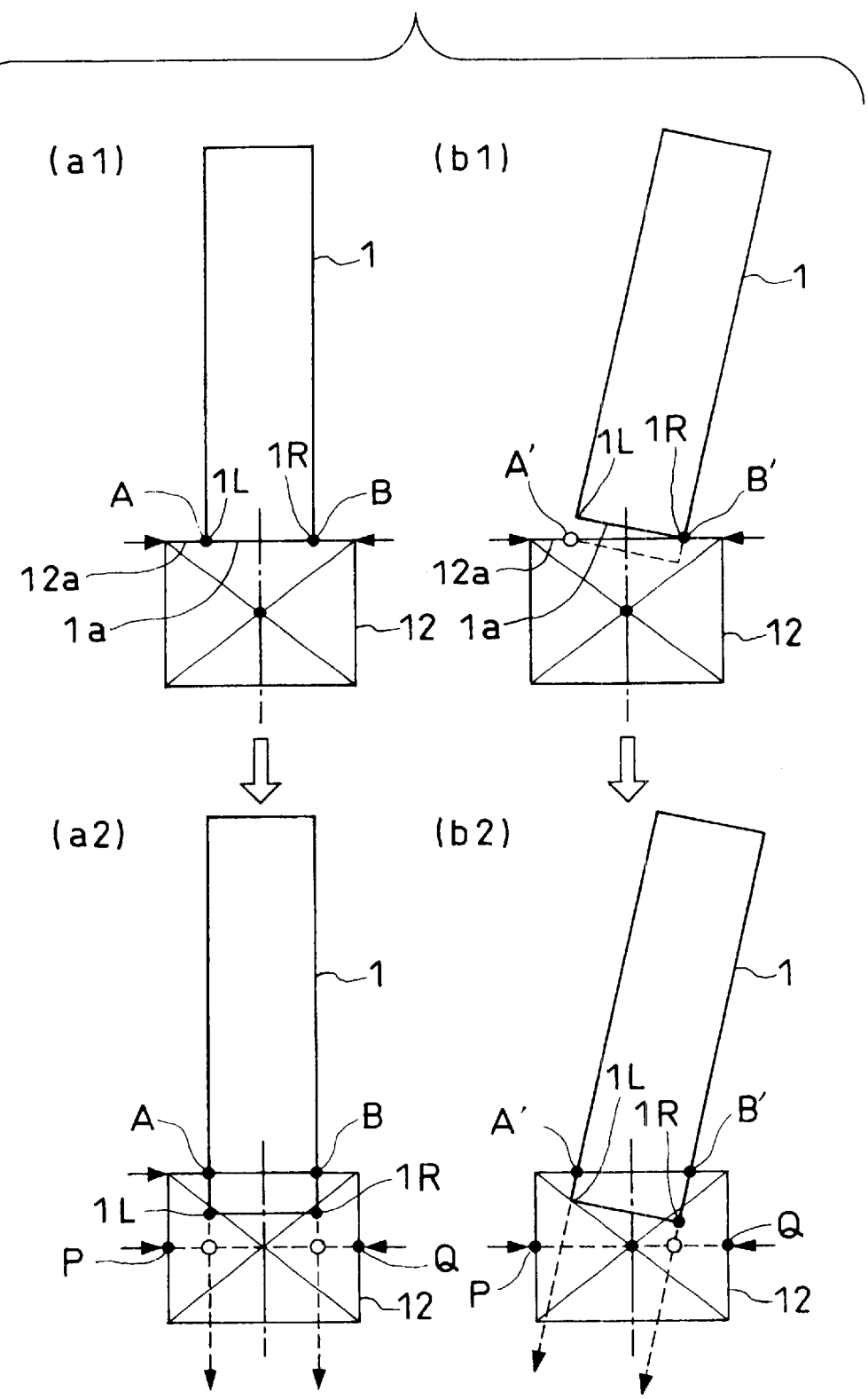
FIG. 5 is a schematic view (No. 1) showing a moving state of a work board as the work board passes through a photographing zone, wherein (a) shows a state of normal moving, and (b) shows a state of slanted moving.
Figure 6:
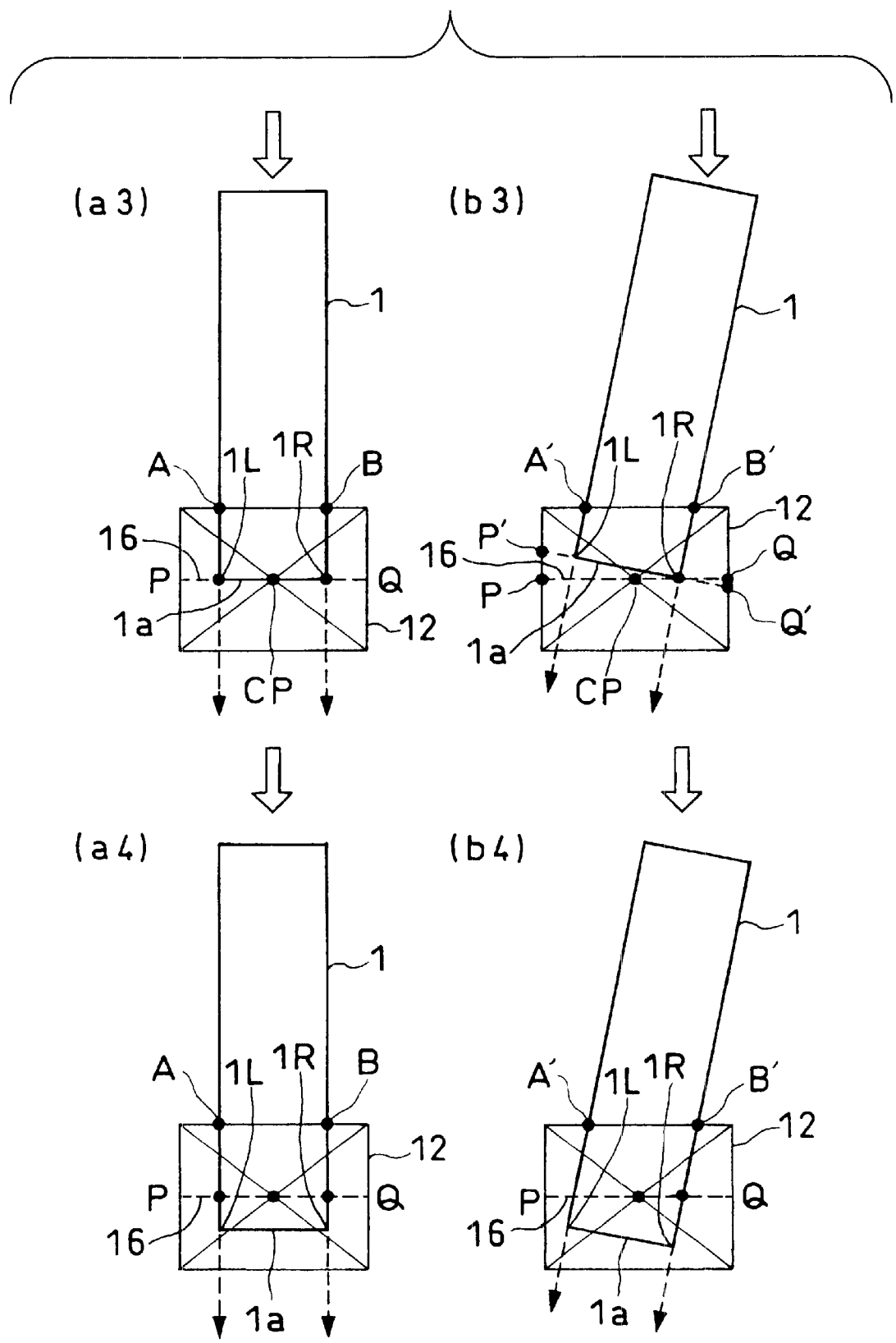
FIG. 6 is a schematic view (No. 2) showing a moving state of a work board as the work board passes through a photographing zone, wherein (a) shows a state of normal moving, and (b) shows a state of slanted moving.
Figure 7:
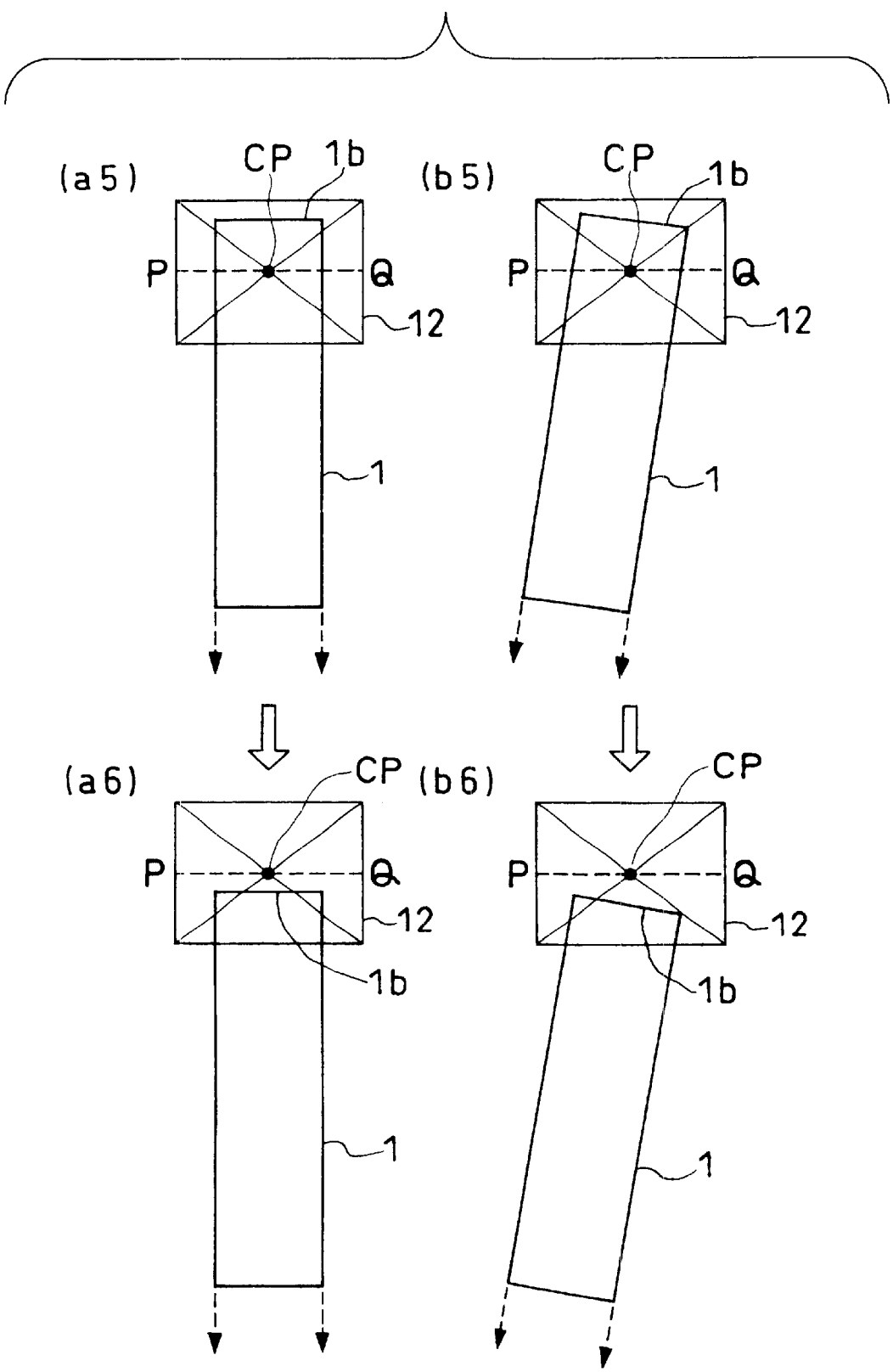
FIG. 7 is a schematic view (No. 3) showing a moving state of a work board as the work board passes through a photographing zone, wherein (a) shows a state of normal moving, and (b) shows a state of slanted moving.

FIGS. 5, 6 and 7 illustrate moving states of the work board 1 when the work board 1 passes through the photographing zone 12 of the digital camera 10. In FIGS. 5, 6 and 7, FIGS. (a1) to (a6) illustrate the states where the work board 1 moves normally (slanted degree=0), whereas FIGS. (b1) to (b6) illustrate the states where the work board 1 moves slantly. The moving positions shown in FIGS. (a1) to (a6) correspond respectively with the moving positions shown in FIGS. (b1) to (b6).

In FIG. 5(a1), the opposite corners 1L (i.e. the left side corner as viewed from the photographing direction) and 1R (i.e. the right side corner as viewed from the photographing direction) of leading end portion 1a of the work board are enabled to simultaneously pass just below the slanted move-detecting line 12a so that the opposite corners 1L and 1R of the leading end portion 1a can be detected simultaneously at both of the left side slanted moving judgment point A and the right side slanted moving judgment point B. In FIG. 5 (b1) however, either one of the opposite corners 1L and 1R of leading end portion 1a of the work board is enabled to pass just below the slanted move-detecting line 12a so that either one of these opposite corners 1L and 1R can be detected by either the left side slanted moving judgment point A' or by the right side slanted moving judgment point B'. In FIG. 5 (b1), the state where the corner portion 1R of leading end portion 1a of the work board is detected by the right side slanted moving judgment point B' is indicated by a solid circle, and the state where the leading end portion 1a of the work board is not yet detected at this moment by the left side slanted moving judgment point A' is indicated by a void circle. Thus, when only one point, i.e. the point B' is detected at first, it can be determined that the work board 1 is moving slantly. These positions can be detected on the basis of a difference in brightness between the surface of the work board 1 and the background 4 (the same, hereinafter).

FIGS. 5 (a2) and 5 (b2) illustrate respectively a state where the leading end portion 1a of the work board 1 has reached up to the position which is immediately before the image data sampling line 16. When the left corner portion 1L is detected at the left side slanted moving judgment point A' in FIG. 5(b2), a slanted degree θ (see FIG. 4) can be determined by the aforementioned equation (2) on the basis of the points A' and B'.

In FIG. 6 (a3), the leading end portion 1a of the work board entirely reaches the image data sampling line 16, whereas, in FIG. 6 (a4) however, the leading end portion 1a of the work board has already passed through the image data sampling line 16. In FIG. 6 (b3), the right corner point 1R is moved at first into the image data sampling line 16, whereas, in FIG. 6(b4) however, the right corner point 1R has already passed through the image data sampling line 16.

In FIG. 7 (a5), the rear end portion 1b of the work board entirely reaches immediately before the image data sampling line 16, whereas, in FIG. 7 (a6) however, the rear end portion 1b of the work board has already passed through the image data sampling line 16. In FIG. 7 (b5), the rear end portion 1b reaches immediately before the image data sampling line 16, whereas, in FIG. 7(b6) however, the rear end portion 1b has already passed through the image data sampling line 16.

In FIGS. 5 to 7, it is assumed that the work board 1 continues to move while keeping the original state taken by the work board 1 when it is moved at first into the photographing zone 12. Namely, when the rear end portion 1b has been moved into the photographing zone 12, it is no more possible to calculate the slanted degree of the work board 1. However, there will be no problem in practical viewpoint even if it is handled on the assumption that the slanted degree that has been finally calculated will be sustained until the rear end portion 1b of the work board is moved into the image data sampling line 16.

Figure 8A:
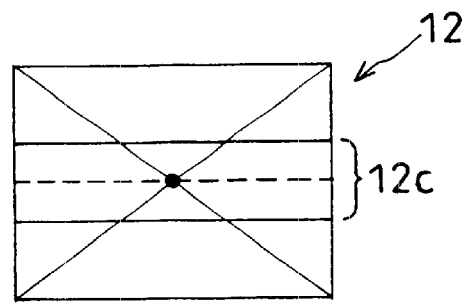
FIG. 8 is a schematic view for explaining the determination of image data sampling line and the extraction of image data required.
Figure 8B:
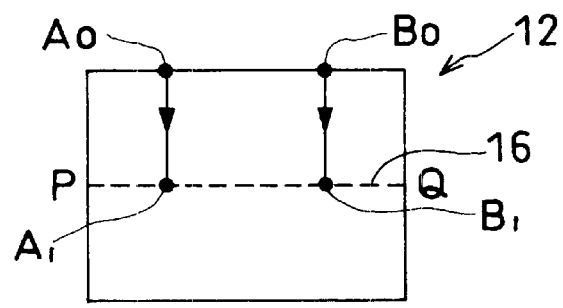
Figure 8C:
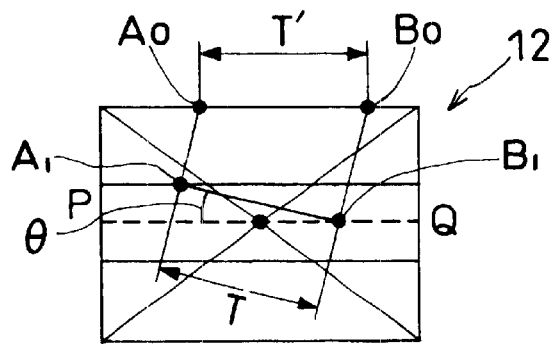

FIG. 8 illustrates the manner of determining the image data sampling line and extracting the image data required. Referring to FIG. 8A, the central rectangular region of the photographing zone 12 is selected as being a photographing-controlling zone 12c. Referring to FIG. 8B, when the bright points A0 and B0 are simultaneously detected, it is determined that the work board is moving normally. When these bright points A0 and B0 reach the image data sampling line 16 (or the image data sampling line PQ which passes through the PC and is parallel with the slanted move-detecting line) and this location of these bright points A0 and B0 is detected, the sampling of the image data on the A1–B1 line is determined (see FIG. 6(a3)). Referring to FIG. 8C, when the bright point B0 has reached over the image data sampling line PQ, it becomes the bright point B1, so that the A1–B1 line shown in FIG. 8C is determined as an image data sampling line and hence, the sampling of the image data on the A1–B1 line is performed on the basis of the slanted degree q (see the formula 2) that has been calculated on the basis of the bright points A0 and B0 detected in advance (see FIG. 4 and FIG. 6(b3)).

Figure 9A:
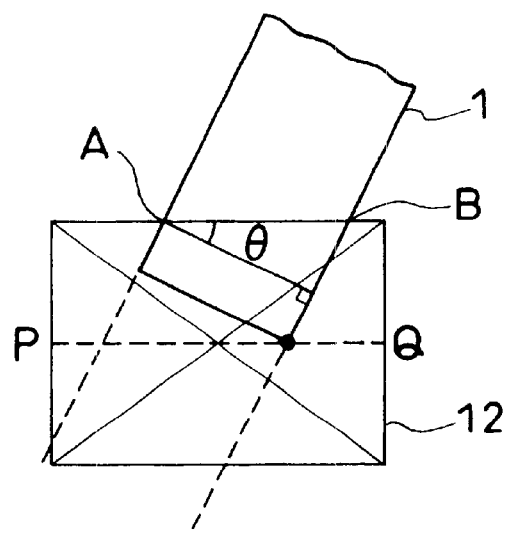
FIG. 9 is a schematic view for explaining one example of determining an abnormal moving of work boards.
Figure 9B:
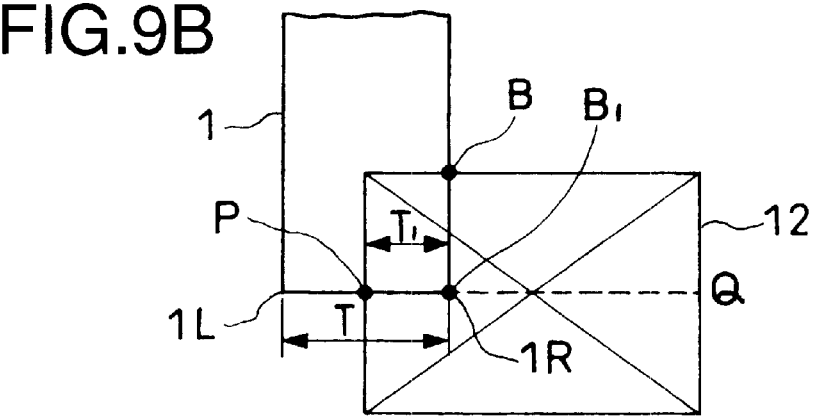
Figure 9C:
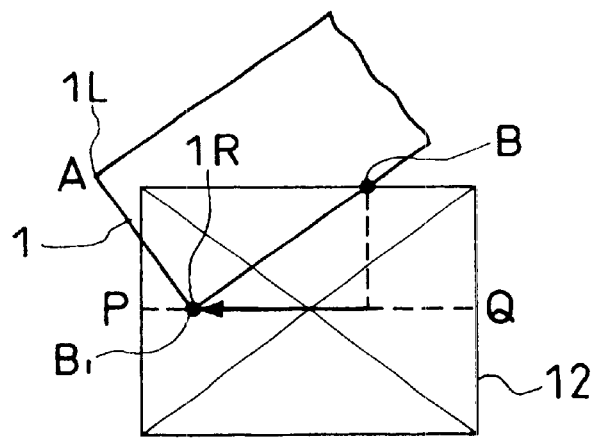

FIG. 9 illustrates one example of determining an abnormal moving of work board 1. FIG. 9A shows an example where the slanted degree θ exceeds over a tolerance, but the slanted degree θ is still measurable. FIG. 9B shows an example where the right corner portion 1R enabled to be detected by the right side slanted moving judgment point B, but the left corner portion 1L is not placed inside the photographying region at all, thus disenabling the left side slanted moving judgment point A to detect the left corner portion 1L, thereby making it impossible to measure the slanted degree. Namely, FIG. 9B shows a moving state of the work board wherein a portion thereof is completely placed outside the photographying region, though the work board is not inclined at all. FIG. 9C shows an example where the work board is being transferred with its left corner portion 1L being positioned outside the photographying region, thereby making it impossible to measure the slanted degree. Namely, FIG. 9C shows a moving state of the work board wherein the slanted degree of work board exceeds greatly from a predetermined tolerance.

Even in the case where the direction of slanted moving of the work board 1 changes within the photographing zone 12 (i.e. meandering), the image data sampling can be performed if the slanted degree of the work board 1 is within a predetermined tolerance range. When it is detected that the slanted state or the meandering state is not within a predetermined tolerance range, the moving state of the work board 1 is judged as being abnormal, thus suspending the sampling of the image data. When the rear end portion 1b of the work board is dislocated out of the image data sampling line 16, the sampling of the image data is also immediately suspended.

Figure 10:
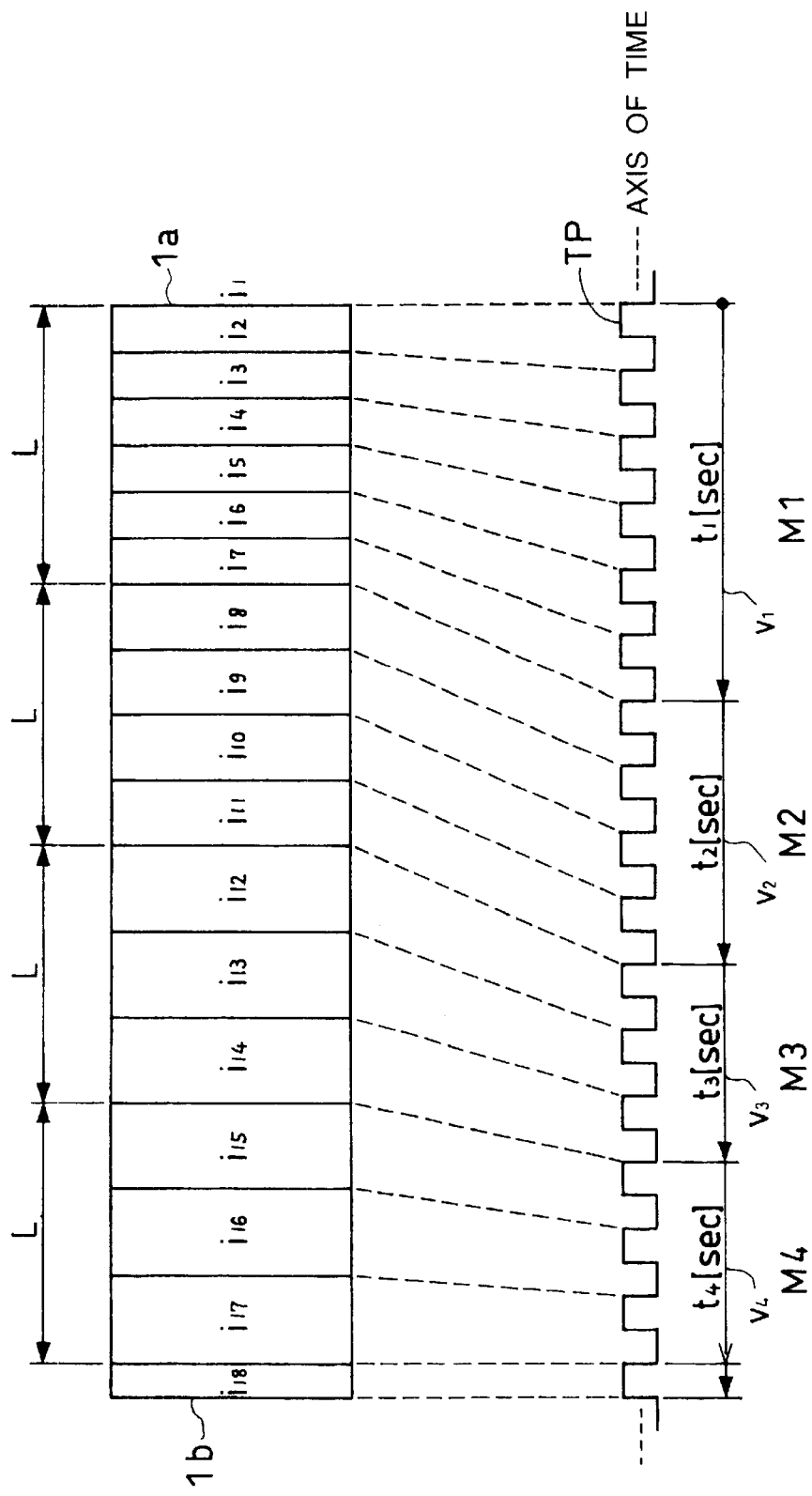
FIG. 10 is a schematic view illustrating the synthesis of the data of the entire image of the work board.

FIG. 10 shows a schematic view illustrating the synthesis of the data of the entire image of the work board 1 (see FIG. 2). Referring to FIG. 10, i1 to i18 represent the line data of the image of work board; t1 to t4 represent respectively the moving time in each of measurement zones M1 to M4; and TP represents a sampling timing pulse. The example shown in FIG. 10 illustrates a case where the velocity of the work board after the leading end portion 1a of the work board has reached the image data sampling line 16 is in the order of: v1<v2<v3≈v4. As seen from this, the image data of work board is to be taken in such a manner that when the velocity of work board is higher, the intervals between neighboring line data i1 to i18 are more densified, and hence, when the velocity of work board is lower, the intervals between neighboring line data i1 to i18 are made more spacious. The example shown in FIG. 10 illustrates an extreme case. Thus, an actual data sampling location is a little moment before the work board is rendered to take a uniform speed moving. Accordingly, by performing such a correction of image data, it become possible to obtain an image data wherein accurate positional information is included in the sampled data of an elongated board.

Figure 11:
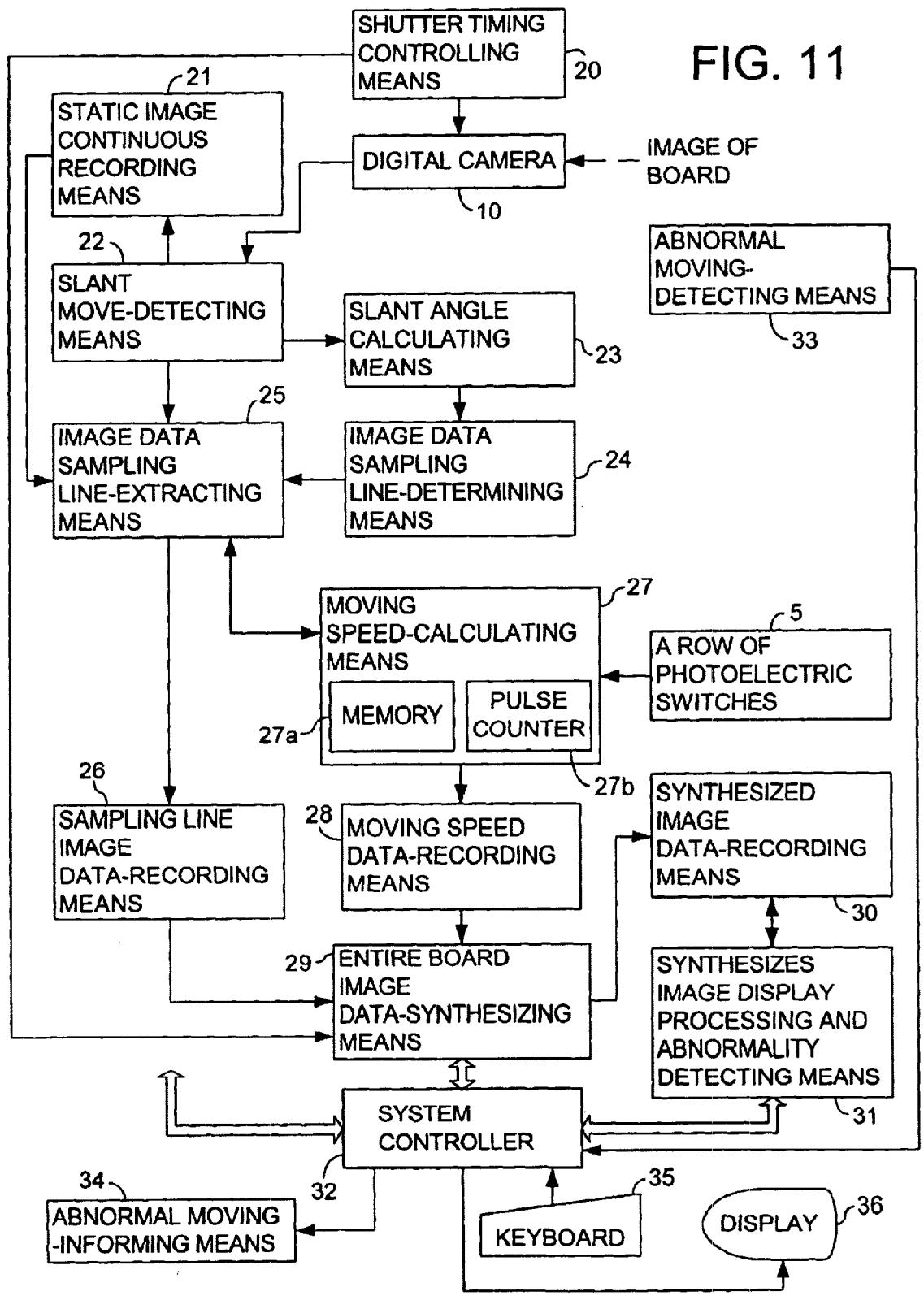
FIG. 11 is a block diagram illustrating the entire construction of the surface inspection system according to one embodiment of the present invention.

FIG. 11 illustrates the entire construction of the surface inspection system according to one embodiment of the present invention. Referring to FIG. 11, a shutter timing control means 20 is designed not only to control the timing of shutter of the digital camera 10, but also to output a shutter timing data to an entire board image data-synthesizing means 29. A static image continuous recording means 21 is designed to continuously record the static images of the rectangular photographing-controlling zone 12c. A slant move detecting means 22 is designed to determine as to if the moving of work board is the normal moving, a slanted moving or an abnormal moving. A slanted degree calculating means 23 is designed to calculate the magnitude of slanted moving. An image data sampling line-determining means 24 is designed to determine the image data sampling line on the basis of the magnitude of the slanted degree.

An image data sampling line-extracting means 25 is designed to extract the image data on the image data sampling line 16. A sampling line image data-recording means 26 is designed to record an extracted image data. A moving speed-calculating means 27 is provided with a memory 27a and a pulse counter 27b, and designed to detect the work board 1 by means of a row of photoelectric switches 5 and to detect the speed changes of the work board 1. A moving speed data-recording means 28 is designed to record the moving speed data of work board 1.

The entire board image data-synthesizing means 29 is designed to synthesize the entire image of work board 1 on the basis of the extracted and recorded image data. A synthesized image data-recording means 30 is designed to record the synthesized image data. A synthesized image display processing and abnormality detecting means 31 is designed to display the recorded synthesized image and to detect abnormal moving if any. A system controller 32 is designed to control the system as a whole. An abnormal move detecting means 33 is designed to detect any abnormal moving of the work board 1. An abnormal moving informing means 34 is designed to inform the abnormal moving of the work board 1 as soon as the abnormal moving is detected. The key board 35 and the display device 36 are the same as those of the conventional computer.

Figure 12:
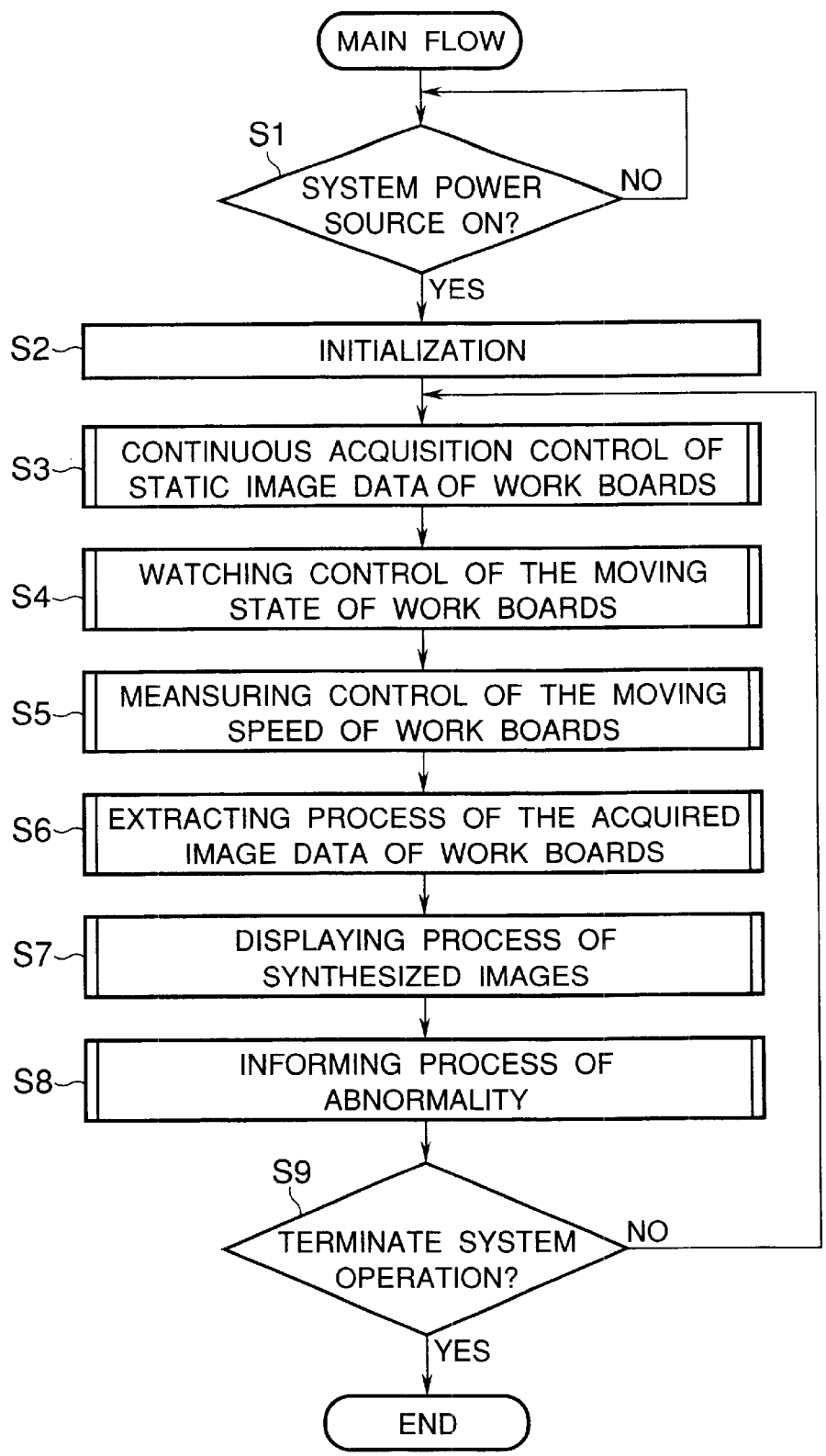
FIG. 12 is a flow chart for explaining the controlling operation of a system controller.

FIG. 12 shows a flow chart for explaining the controlling operation of the system controller 32. Referring to FIG. 12, first of all, a judgment is performed as to whether the system power source is ON or not (step S1). If the answer is NO, the system is held in a state of standby. If the answer is YES, the initialization of the system is performed (step S2).

Figure 13:
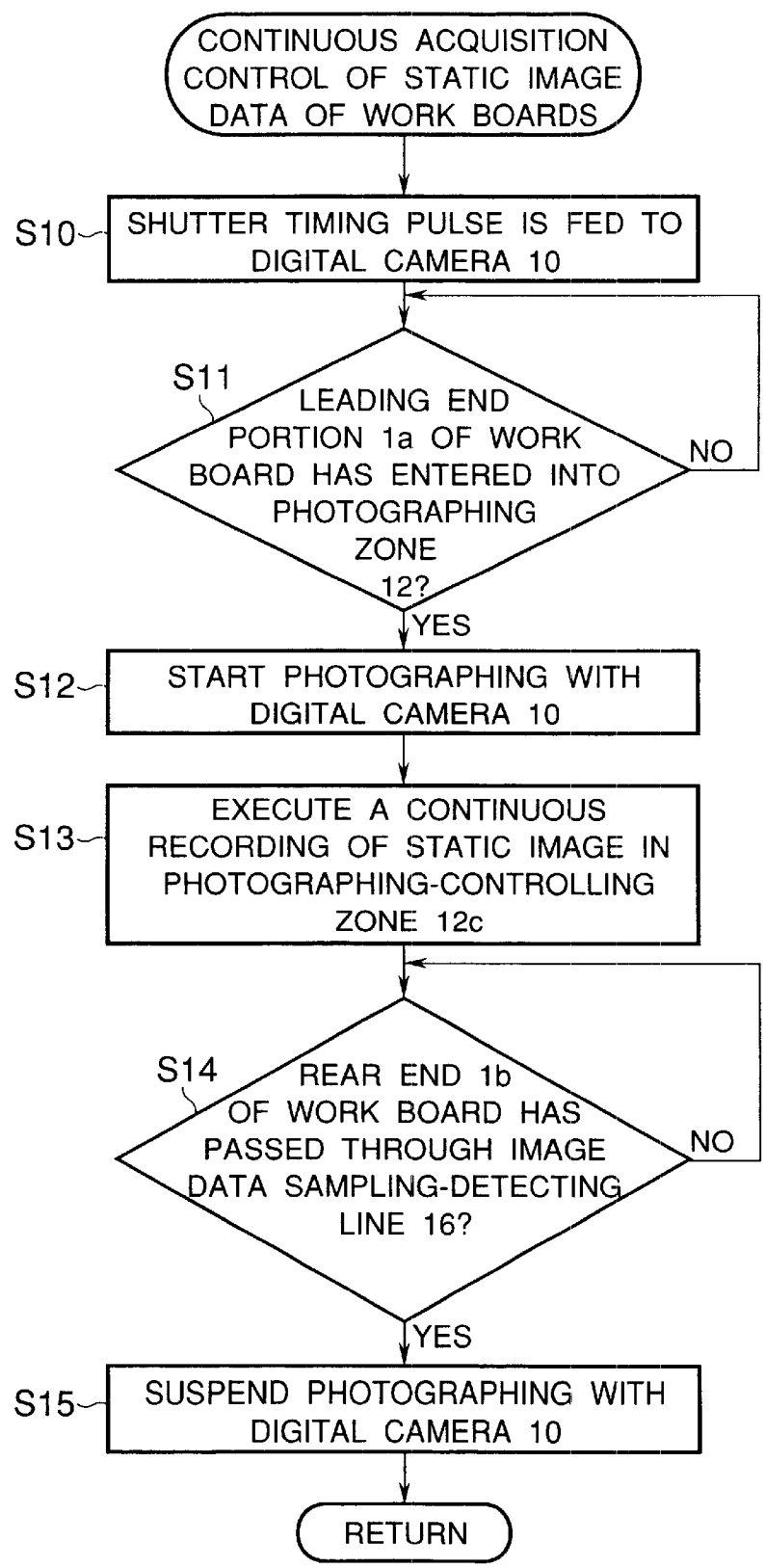
FIG. 13 is a flow chart for explaining in detail the operation of continuous acquisition and controlling of static image data of work boards.

In the next step S3, the controlling of camera such as the controlling of shutter is performed for the continuous acquisition control of static image data of work boards (to be explained in detail in FIG. 13). In the step S4, a slanted moving or an abnormal moving of work boards is detected for the watching control of the moving state of work boards (to be explained in detail in FIGS. 14 and 15). In the step S5, changes in moving speed of work boards are detected for the measuring control of the moving speed of work boards (to be explained in detail in FIG. 16). In the step S6, extracting of required line image data and synthesize entire image of work boards for the extracting process of the acquired image data of work boards (to be explained in detail in FIG. 17).

Figure 18:
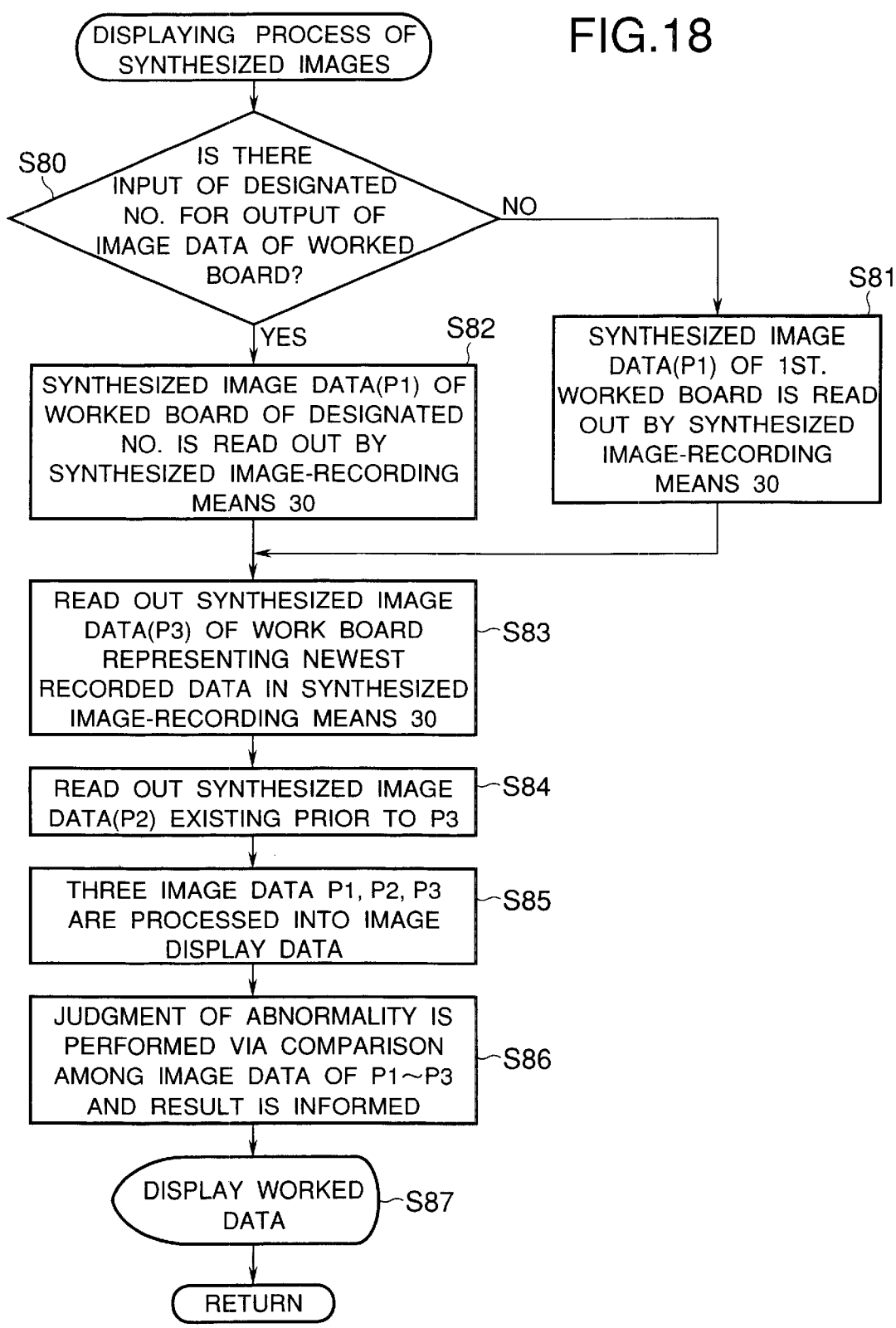
FIG. 18 is a flow chart explaining in detail the operation of displaying and processing the image of synthesized image.

In the step S7, the image of a work board having a designated number among those that have been already worked, the image of a work board that has just finished the working thereof, and the image of a work board which has been worked prior to the second mentioned work board are simultaneously displayed for the displaying process of synthesized images (to be explained in detail in FIG. 18). In the step S8, an abnormal moving, if any, is informed of, and at the same time, an abnormal working, if any, is informed of after the evaluation of the image for the informing process of abnormality. In the step S9, a judgment is made as to whether the operation of the system should be terminated or not. If the answer is NO, the operation is turned back to the step S3. If the answer is YES, the operation is terminated.

FIG. 13 illustrates in detail the operation of the continuous acquisition control of static image data of work boards in the step S3. Referring to FIG. 13, the shutter timing pulse is fed from the shutter timing controlling means 20 to the digital camera 10 (step S10). In the step S11, a judgment is made as to whether or not the leading end portion 1a of the work board has been moved into the photographing zone 12. Namely, the movement of the leading end portion 1a of the work board over the slanted move-detecting line 12a (FIG. 4) is judged through the watching control of the moving state of work boards in the step S4. If it is judged that the leading end portion 1a of the work board is not yet moved into the photographing zone 12, the control is kept in a state of standby. Whereas if it is judged that the leading end portion 1a of the work board has been moved into the photographing zone 12, the procedure is advanced to the step S12, and the photographing by means of the digital camera 10 is started, thus outputting data to a recording medium according to the sampling timing pulse TP.

In the step S13, a continuous recording of static images (the RGB data of each pixel on a recording medium) on the rectangular photographing-controlling zone 12c (see FIG. 8) is executed. In the step S14, a judgment is made as to whether or not the rear end portion 1b of the work board has passed through the image data sampling line 16. If it is judged that the rear end portion 1b of the work board is not yet passed through the image data sampling line 16, the control is kept in a state of standby. Whereas if it is judged that the rear end portion 1b of the work board has passed through the image data sampling line 16, the photographing by means of the digital camera 10 is suspended, thus suspending the data output to a recording medium (step S15).

Figure 14:
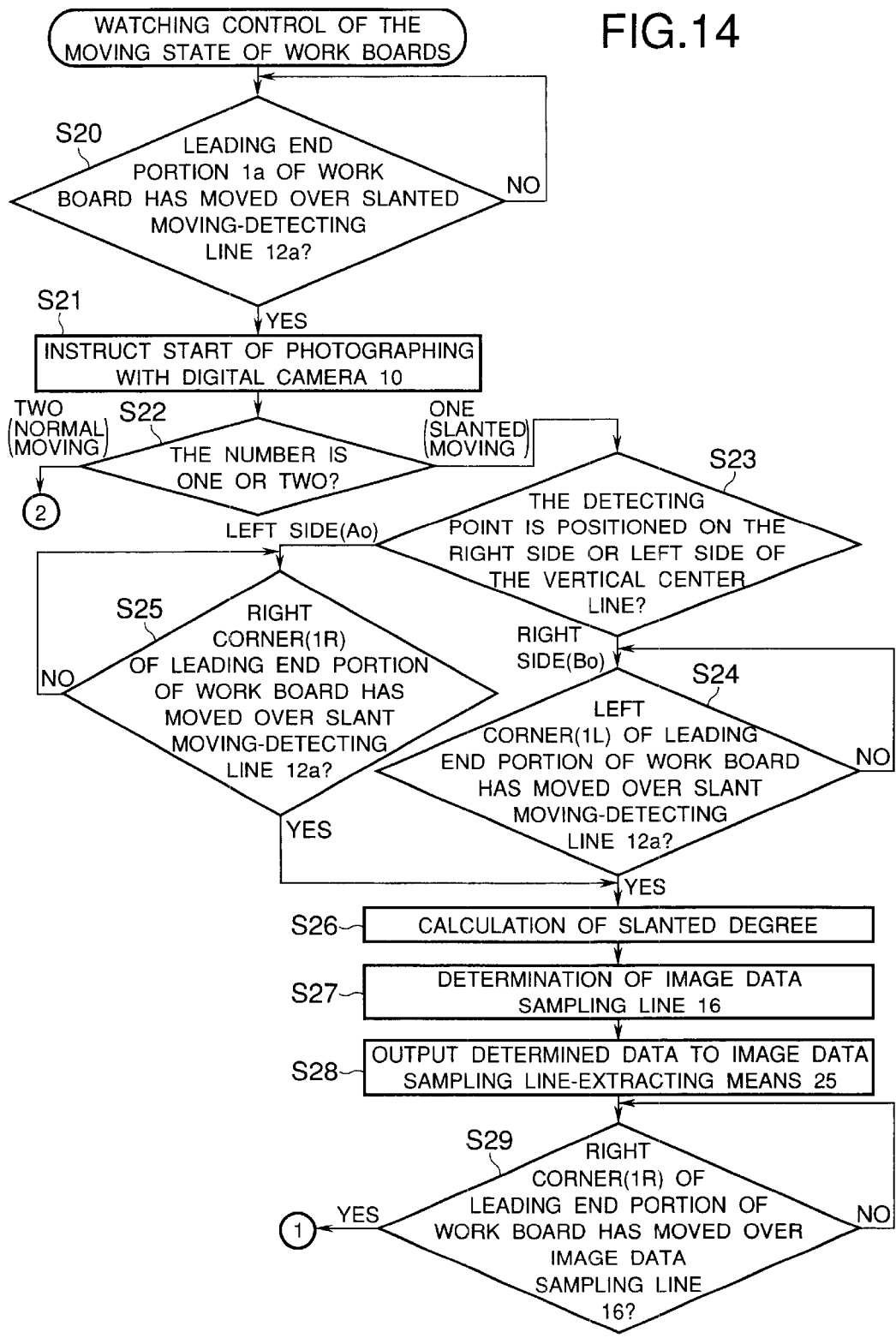
FIG. 14 is a flow chart (No. 1) for explaining in detail the operation of watching and controlling the moving state of work boards.
Figure 15:
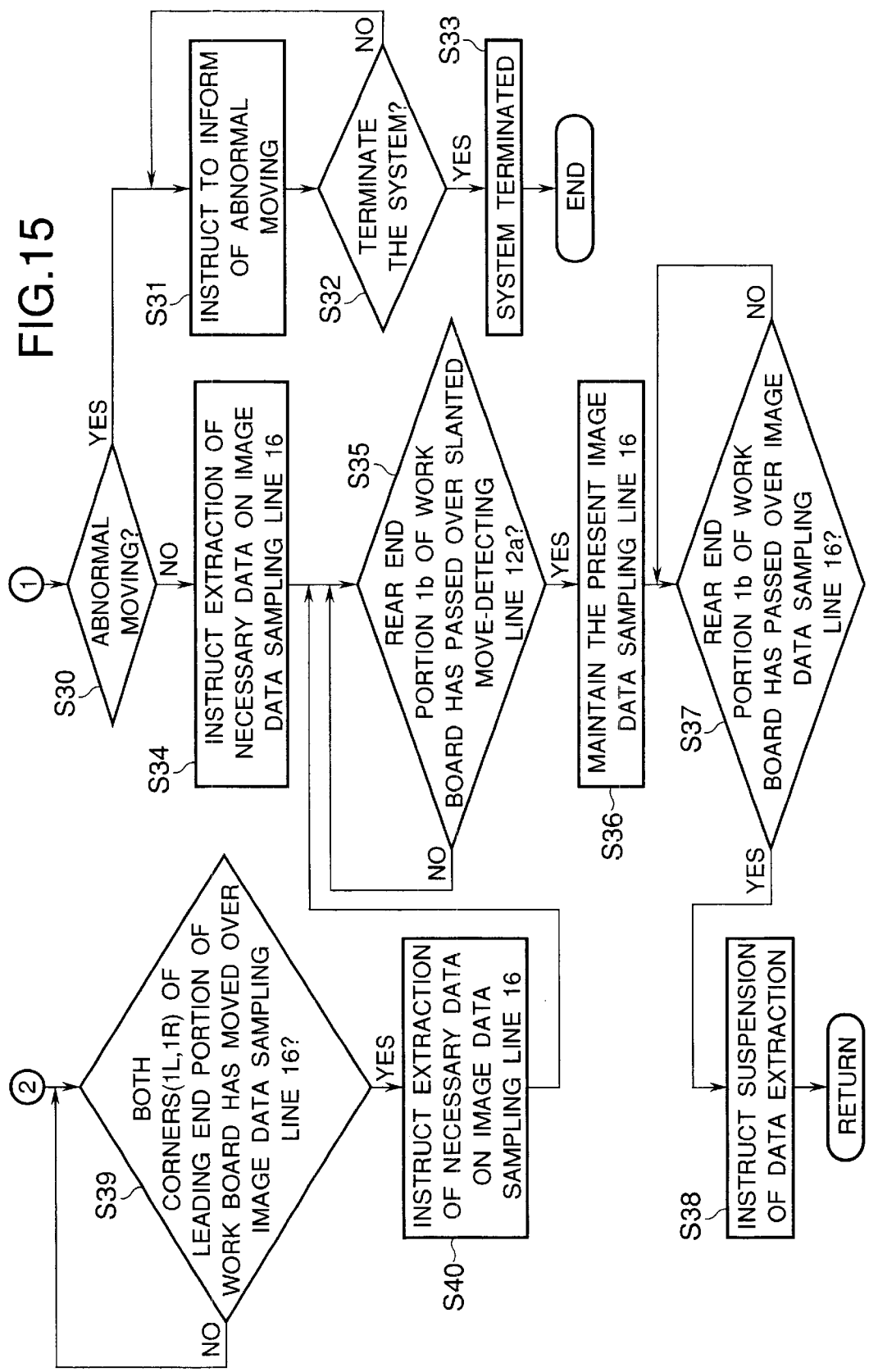
FIG. 15 is a flow chart (No. 2) for explaining in detail the operation of watching and controlling the moving state of work boards.

FIGS. 14 and 15 respectively represents a flow chart for explaining in detail the operation of the watching control of the moving state of work boards in the step S4 (see FIGS. 5 to 7). In the step S20, a judgment is made as to whether or not the leading end portion 1a of the work board has moved over the slanted move-detecting line 12a. If the answer is NO, the control is kept in a state of standby until the leading end portion 1a is moved over the slanted move-detecting line 12a. Whereas if the answer is YES, the digital camera 10 is instructed to start the photographing (step S21). In the step S22, a judgment is made as to if the number of the detecting point (A or B) is one or two. If it is judged that the number of the detecting point is one, the work board is determined as moving a slanted manner, so that the procedure is advanced to the step S23. Whereas if it is judged that the number of the detecting point is two, the work board is determined as moving normally, so that the procedure is advanced to the step S39.

In the step S23, a judgment is made as to if the detecting point is positioned on the right side or left side of the center line 14 (see FIG. 3). If it is judged that the detecting point is positioned on the right side, the procedure is advanced to the step S24. Whereas if it is judged that the detecting point is positioned on the left side, the procedure is advanced to the step S25. In the step S24, a judgment is made as to whether or not the left corner portion 1L of the leading end portion of work board has been moved over the slanted move-detecting line 12a. If the answer is YES, the procedure is advanced to the step S26. Whereas if the answer is NO, the control is kept in a state of standby until the left corner portion 1L is moved over the slanted move-detecting line 12a. In the step S25, a judgment is made as to whether or not the right corner portion 1R of the leading end portion of work board has been moved over the slanted move-detecting line 12a. If the answer is YES, the procedure is advanced to the step S26. Whereas if the answer is NO, the control is kept in a state of standby. In the step S26, the slanted degree θ of the work board is calculated according to the equation (2) so as to determine the image data sampling line 16 (step S27), and the resultant data thus determined is output to the image data sampling line-extracting means 25 (step S28), thus enabling the procedure to proceed to the step S29.

In the step S29, a judgment is made as to whether or not the right corner portion 1R of the leading end portion of work board has been moved over the image data sampling line 16. If the answer is NO, the control is kept in a state of standby. Whereas if the answer is YES, the procedure is advanced to the step S30 (see FIG. 9) so as to make a judgment to see if the moving of work board is abnormal. If the moving of work board is not abnormal, the procedure is advanced to the step S31. Whereas if the moving of work board is abnormal, the abnormal moving is informed of (step S31 or step S8), on the basis of which a judgment is made as to whether or not the system should be terminated (step S32). If the answer is YES so as to terminate the system, a procedure for terminating the system is performed. Whereas if the answer is NO, i.e. the termination of system is not indicated, the procedure is turned back to the step S31 so as to continue to inform of the abnormality. In the step of S34, the extraction of necessary data on the image data sampling line 16 is instructed. In the step S35, a judgment is made as to whether or not the rear end portion 1b of the work board has passed through the slanted move-detecting line 12a. If the answer is NO, the control is kept in a state of standby until the rear end portion 1b passes through the slanted move-detecting line 12a. Whereas if the answer is YES, the image data sampling line 16 is maintained (step S36). In the step S37, a judgment is made as to whether or not the rear end portion 1b of the work board has passed through the image data sampling line 16. If the answer is NO, the control is kept in a state of standby until the rear end portion 1b passes through the image data sampling line 16. Whereas if the answer is YES, the suspension of data extraction is instructed (step S38).

In the step S39, a judgment is made as to whether or not both corner portions 1L and 1R of the leading end portion of the work board have passed through the image data sampling line 16 (see FIG. 6 (a3)). If the answer is NO, the control is kept in a state of standby until both corner portions 1L and 1R pass through the image data sampling line 16. Whereas if the answer is YES, the required data extraction on the image data sampling line 16 is instructed (step S40).

Figure 16:
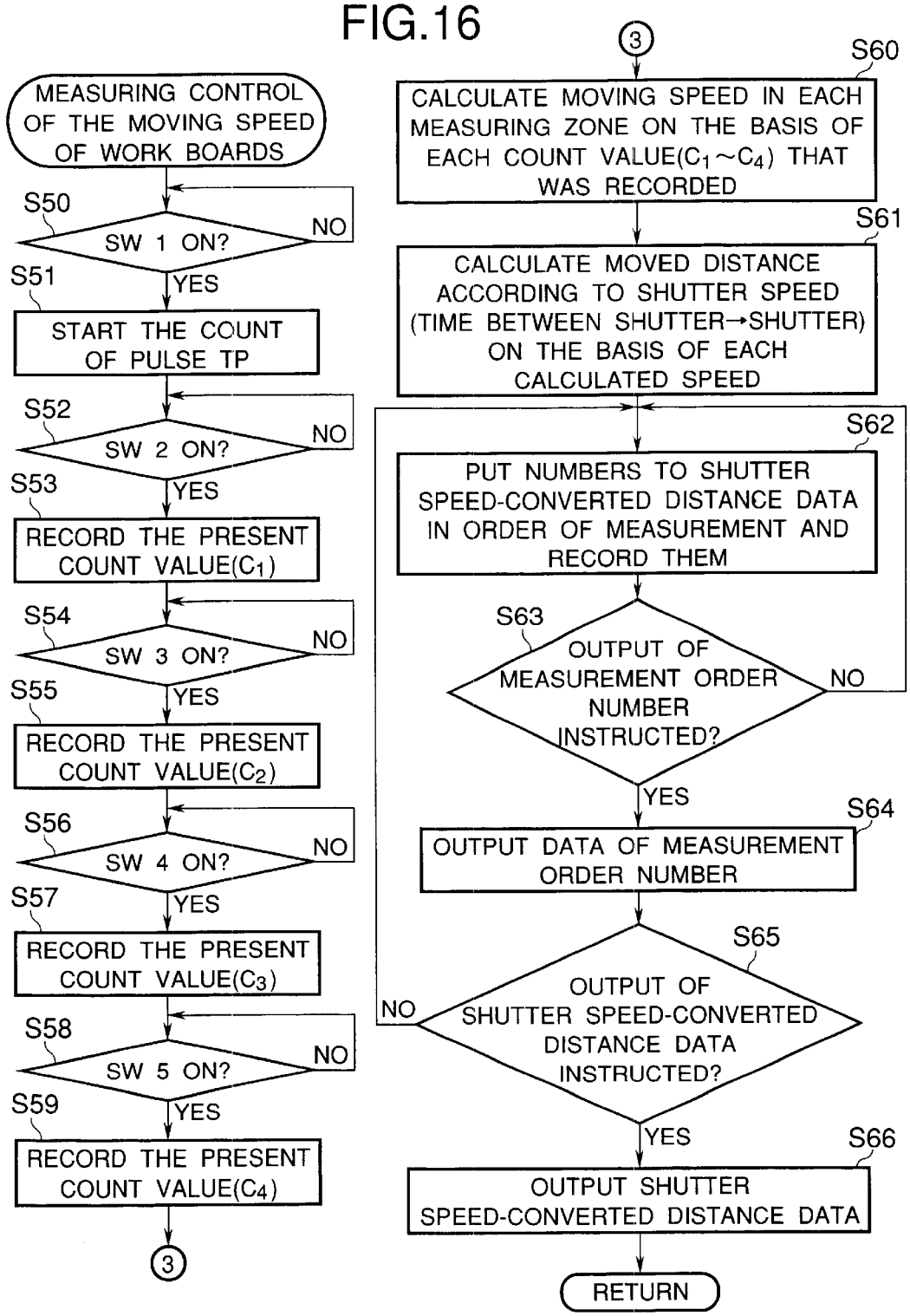
FIG. 16 is a flow chart for explaining in detail the operation of measuring and controlling the moving velocity of work boards.

FIG. 16 is a flow chart for explaining in detail the operation of the measuring control of the moving speed of work boards in the step S5. In the step S50, a judgment is made as to whether or not the photoelectric switch SW1 which is disposed at the first position is turned ON. If the answer is NO, the control is kept in a state of standby until it becomes ON. Whereas if the answer is YES, the counting of sampling timing pulse TP is started (step S51). In the step S52, a judgment is made as to whether or not the photoelectric switch SW2 is turned ON. If the answer is NO, the control is kept in a state of standby until it becomes ON. Whereas if the answer is YES, the present counted value is recorded (this counted value is designated as C1) (step S53).

In the same manner, in the step S54, a judgment is made as to whether or not the photoelectric switch SW3 is turned ON. If the answer is NO, the control is kept in a state of standby until it becomes ON. Whereas if the answer is YES, the present counted value is recorded (C2) (step S55). Further, in the step S56, a judgment is made as to whether or not the photoelectric switch SW4 is turned ON. If the answer is NO, the control is kept in a state of standby until it becomes ON. Whereas if the answer is YES, the present counted value is recorded (C3) (step S57). Furthermore, in the step S58, a judgment is made as to whether or not the photoelectric switch SW5 is turned ON. If the answer is NO, the control is kept in a state of standby until it becomes ON. Whereas if the answer is YES, the present counted value is recorded (C4) (step S59).

The moving speed in each measuring zone is calculated on the basis of each recorded counted value (C1 to C4) (step S60), and then, the moved distance corresponding with the shutter speed (the time between shutter>shutter) is calculated on the basis of each calculated moving speed (step S61). In the step S62, the data on the shutter speed-converted distance is affixed with a number and recorded in order of measurement, and in the step S63, a judgment is made as to whether or not there is an instruction to output the measurement order. If the answer is NO, the procedure is turned back to the step S62 to continue the recording. Whereas if the answer is YES, the output of the data on the measurement order is executed (step S64). In the step S65, a judgment is made as to whether or not there is an instruction to output the data on the shutter speed-converted distance. If the answer is NO, the procedure is turned back to the step S62 to continue the recording. Whereas if the answer is YES, the output of the data on the shutter speed-converted distance is executed (step S66).

Figure 17:
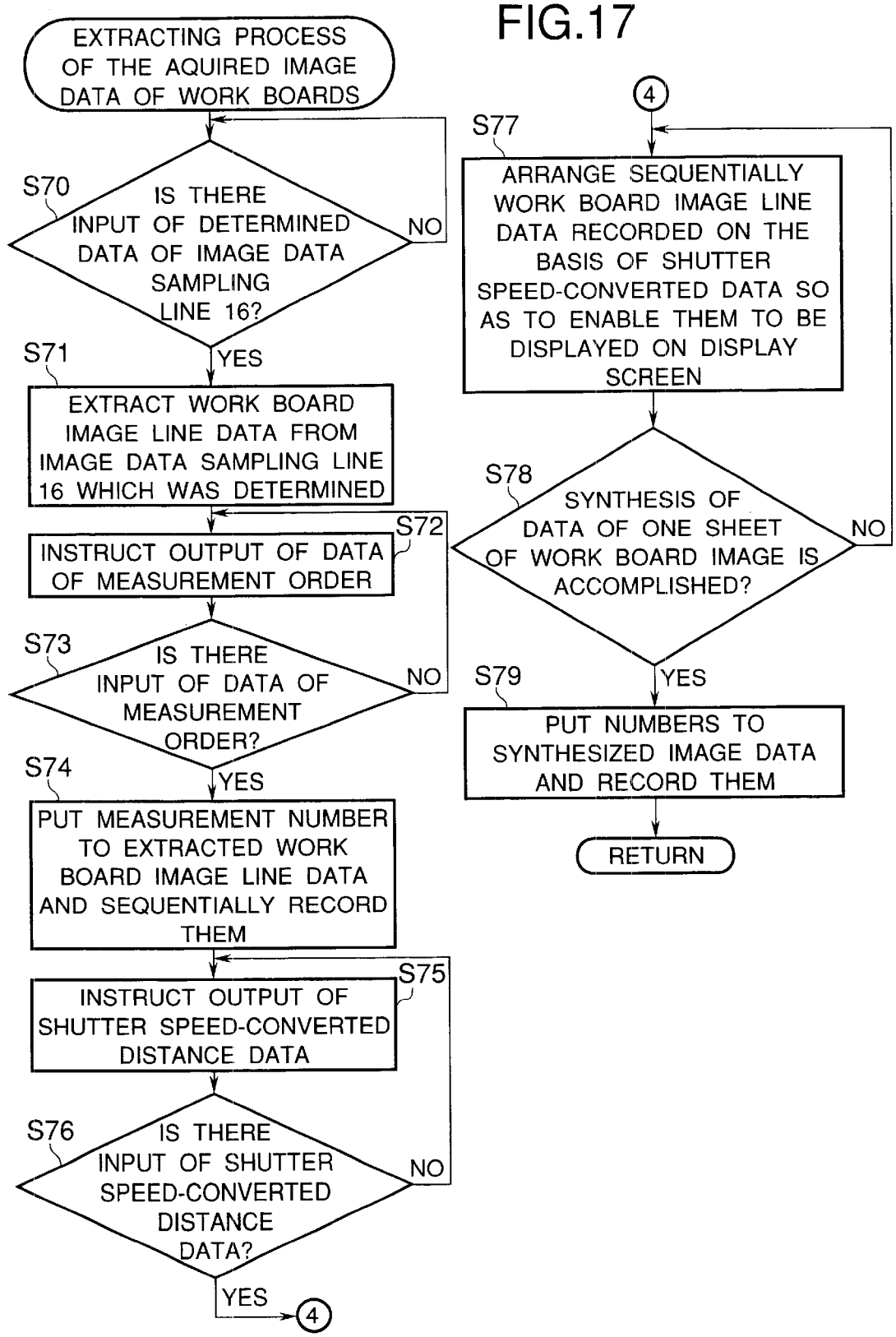
FIG. 17 is a flow chart explaining in detail the operation of extracting and processing the image data of work boards obtained.

FIG. 17 is a flow chart explaining in detail the operation of the extracting process of the acquired image data of work boards in the step S6. In the step S70, a judgment is made as to whether or not there is an input of the data on the determination of the image data sampling line 16. If the answer is NO, the procedure is kept in a state of standby until the input is executed. Whereas if the answer is YES, the procedure is advanced to the step S71, wherein a work board image line data (see FIG. 10) is extracted from the determined image data sampling line 16, thereafter instructing to output the data on the measurement order (the step S72). In the step S73, a judgment is made as to whether or not there is an input of the data on the measurement order. If the answer is NO, the procedure is turned back to the step S72 so as to continue to output the data on the measurement order. Whereas if the answer is YES, the procedure is advanced to the step S74.

In the step S74, the measurement numbers i1, i2, i3, - - - are sequentially recorded in the extracted work board line data, and the output of data on the shutter speed-converted distance is instructed (the step S75). In the step S76, a judgment is made as to whether or not there is an input of data on the shutter speed-converted distance. If the answer is NO, the procedure is turned back to the step S75 to continue to output the data on the shutter speed-converted distance. Whereas if the answer is YES, the extracted work board line data that have been recorded on the basis of the input shutter speed-converted distance are arranged sequentially in a state to enable them to be displayed on the display screen (step S77).

In the step S78, a judgment is made as to whether or not the synthesis of one sheet of work board image data has been accomplished. If the answer is NO, the procedure is turned back to the step S77 to continue to arrange the data. Whereas if the answer is YES and the accomplishment of the data synthesis is admitted, the synthesized image data is affixed with a number and recorded in the system (step S79), after which the procedure is turned back to the step S7.

FIG. 18 is a flow chart explaining in detail the operation of the displaying process of synthesized images in the step S7. In the step S80, a judgment is made as to whether or not there is an input of designated number (to be input by means of the key board 35) for outputting the image data on the processed work board. If the answer is NO, i.e. there is no input of designated number, the procedure is advanced to the step S81 wherein the synthesized image data that has been processed at first is read out by means of the synthesized image-recording means 30 (image data P1), after which the procedure is advanced to the step S83. Whereas if the answer is YES, i.e. there is an input of designated number, the procedure is advanced to the step S82, wherein the processed synthesized image data of the designated number is read out by means of the synthesized image-recording means 30 (image data P1). In the step S83, the synthesized image data which is a newest recording data of the synthesized image-recording means 30 is read out (image data P3). In the step S84, a synthesized image data which is existed immediately before that of P3 is read out (image data P2).

Figure 19:
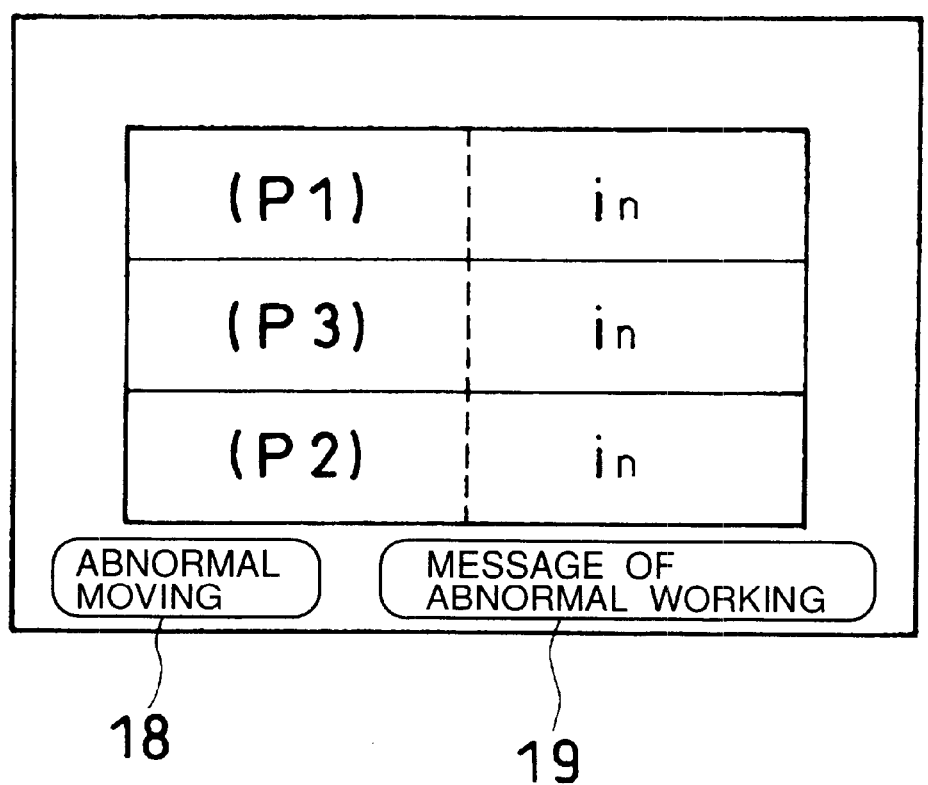
FIG. 19 is a diagram showing one example of displaying the image of the work board that has been inspected.

In the step S85, three image data P1, P2 and P3 that have been read out in the processes S81 to S84 are processed into image display data (see FIG. 19). In the step S86, a judgment regarding any abnormality is performed through comparison among these three image data (comparisons regarding the RGB values among them, and in relative to a reference value) and the abnormality is informed of if there is any, and at the same time, the processed data is displayed on the display 36 (step S87).

FIG. 19 illustrates one example of displaying the image of the work board that has been inspected. Namely, FIG. 19 shows in order, from the top, of the synthesized image data P1 of the finished work board of a designated number, the synthesized image data P3 of the work board which is disposed immediately behind the aforementioned finished work board, and the synthesized image data P2 of the finished work board which is disposed immediately before the aforementioned finished work board. In this case, these work boards are displayed in such a manner that the top and bottom as well as the right and left edges of work board are aligned with those of other work boards, and that only the design portion is displayed (i.e. the rabbeted edges are removed). Additionally, they are displayed with the line of identical number of each work board image line data in being put in order. Furthermore, any abnormal moving 18 and message of any defective working 19 are also displayed at a lower portion.

As explained above, according to the present invention, the entire image of moving work board is evaluated by integrating and synthesizing the image data on each single corrected static image line that has been sampled using a digital camera, a finish-worked state in each working process of an elongated work board which is being allowed to individually move can be inspected very precisely without depending on the operator's naked eyes.

This specification includes part or all of the contents as disclosed in the specification and/or drawings of Japanese Patent Application No. 81811/1999, which is a priority document of the present application.

All publications, patents and patent applications cited herein are incorporated herein by reference in their entirety.

What is claimed is:

1. A surface inspection system for work boards, comprising:
    a digital camera for photographing at least one elongated work board;
    image data-extracting means for extracting line image data on a sampling line intersecting with a moving direction of the at least one elongated work board from an output of said digital camera; and
    image data-synthesizing means for integrating and synthesizing the line image data being output from said image data-extracting means, wherein said image data-extracting means is designed to take, as the sampling line thereof, a line which passes through an intersection point between a pair of diagonal lines in a photographing zone of said digital camera and intersects with a longitudinal direction of movement of the at least one elongated work board in a substantially orthogonal manner.

2. The surface inspection system according to claim 1, further comprising velocity measuring means for measuring a moving velocity of the at least one elongated work board, and said image data-synthesizing means being structured to determine positional information of the line image data relative to an entire body of the at least one elongated work board, the positional information being based upon the moving velocity.

3. A surface inspection system for work boards, comprising:
    a digital camera for photographing at least one elongated work board;
    image data-extracting means for extracting line image data on a sampling line intersecting with a moving direction of the at least one work board from an output of said digital camera, said image data-extracting means is designed to take, as the sampling line thereof, a line which passes through an intersection point between a pair of diagonal lines in a photographing zone of said digital camera and intersects with a longitudinal direction of movement of the at least one elongated work boards in a substantially orthogonal manner,
    image data-synthesizing means for integrating and synthesizing the line images data output from sad image data-extracting means further comprising; and a slant angle measuring means to measure the slant angle of the at least one elongated work board, and wherein said image data-extracting means is structured to change the sampling line on the basis of the measured slant angle.

4. The surface inspection system according to claim 3, wherein said slant angle measuring means is structured to measure the slant angle of the work boards on a basis of the distance between a pair of intersection points to be formed between one straight line in the photographing zone of the digital camera and an outer line of the work board.

5. The surface inspection system according to claim 3, wherein said slant angle measuring means is designed to detect abnormal movement of the work boards.

* * * * *